US008600055B2

(12) United States Patent
Cotner

(10) Patent No.: US 8,600,055 B2
(45) Date of Patent: Dec. 3, 2013

(54) METHOD AND SYSTEM USING STEALTH NOISE MODULATION

(75) Inventor: Carl F. Cotner, State College, PA (US)

(73) Assignee: Raytheon Company, Waltham, MA (US)

( * ) Notice: Subject to any disclaimer, the term of this patent is extended or adjusted under 35 U.S.C. 154(b) by 250 days.

(21) Appl. No.: 12/803,033

(22) Filed: Dec. 17, 2010

(65) Prior Publication Data
US 2012/0155640 A1   Jun. 21, 2012

(51) Int. Cl.
*H04K 1/02*   (2006.01)
(52) U.S. Cl.
USPC ........................................... 380/252; 380/253
(58) Field of Classification Search
USPC .................................................... 380/252, 253
See application file for complete search history.

(56) References Cited

U.S. PATENT DOCUMENTS

| | | | |
|---|---|---|---|
| 5,357,541 A | 10/1994 | Cowart | |
| 5,579,337 A | 11/1996 | Grinstein et al. | |
| 6,064,701 A | 5/2000 | Tresser et al. | |
| 6,385,727 B1 | 5/2002 | Cassagnol et al. | |
| 6,392,585 B2 * | 5/2002 | Huff et al. | 342/16 |
| 6,438,666 B2 | 8/2002 | Cassagnol et al. | |
| 6,851,052 B1 | 2/2005 | Graveman | |
| 7,167,984 B2 | 1/2007 | Graveman | |
| 7,587,011 B2 * | 9/2009 | Smith et al. | 375/354 |
| 7,710,856 B2 * | 5/2010 | Mueller et al. | 370/206 |
| 7,912,215 B2 * | 3/2011 | Furusawa et al. | 380/43 |
| 7,949,032 B1 * | 5/2011 | Frost | 375/140 |
| 8,370,635 B2 * | 2/2013 | Delp et al. | 713/176 |
| 2003/0156672 A1 * | 8/2003 | O'Shea et al. | 375/365 |
| 2004/0005017 A1 * | 1/2004 | Borowski et al. | 375/329 |
| 2005/0228659 A1 * | 10/2005 | Mitlin | 704/226 |
| 2007/0182607 A1 * | 8/2007 | Furusawa et al. | 341/120 |
| 2008/0063208 A1 * | 3/2008 | Ikushima et al. | 380/278 |
| 2010/0226497 A1 | 9/2010 | Michaels et al. | |

OTHER PUBLICATIONS

Yang Hongbing et al. "Design of noise modulation continuous wave RF stealth radar waveform", IEEE International Conference on Sep. 14-16, 2011, 4 pages.*
Notification of Transmittal of the International Search Report dated Feb. 27, 2012, PCT/US2011/060334.
The International Search Report dated Feb. 27, 2012, PCT/US2011/060334.
Written Opinion of the International Searching Authority dated Feb. 27, 2012, PCT/US2011/060334.
Notification Concerning Transmittal of International Preliminary Report on Patentability (Chapter I of the Patent Cooperation Treaty) dated Jun. 27, 2013, PCT/US2011/060334, 1 page.
International Preliminary Report on Patentability dated Jun. 18, 2013, PCT/US2011/060334, 1 page.
Written Opinion of the International Searching Authority, PCT/US2011/060334 Feb. 27, 2012, 7 pages.

* cited by examiner

*Primary Examiner* — Krisna Lim
(74) *Attorney, Agent, or Firm* — Daly, Crowley, Mofford & Durkee, LLP

(57) ABSTRACT

A communications system includes a modulator having a first input to receive a synchronization key and to generate a synchronization signal having encoded therein the synchronization key to enable synchronization of a message signal, a second input to generate Gaussian noise generated by a pseudo-random number generator, and an output port to provide a modulated synchronization signal. The modulated synchronization signal and the message signal appear as random noise. In further embodiment, the communications system includes a demodulator having a first input to receive the synchronization signal, a second input to receive a comparison signal, and an output port to provide a synchronization output signal.

20 Claims, 4 Drawing Sheets

METHOD AND SYSTEM USING STEALTH NOISE MODULATION

FIELD OF THE INVENTION

The inventive systems and methods generally relate to communications and, in particular, to noise modulation to provide stealth communications.

BACKGROUND

Many organizations seek to develop and deploy messaging systems which minimize message detection during transmission, particularly from third parties attempting to detect and interpret the transmissions. For example, the Defense Advanced Research Projects Agency (DARPA) is seeking to develop and deploy stealth messaging systems to minimize unwanted message detection during transmission.

As is known in the art, there are many ways to provide stealth messaging to minimize unwanted third party message detection during transmission. For the most part, however, many of these methods introduce artifacts which third parties may exploit to detect and intercept messages during transmission and attempt to decode/decipher the message.

As is also known in the art, there are many possible ways to synchronize a transmitter and a receiver during message transmission. Some methods use feedback from the receiver to the transmitter to synchronize a broadcast. Other known methods access and/or provide a precise external timing reference signal to synchronize a broadcast signal. For example, a transmitter and a receiver may access a global positioning system (GPS) external timing reference signal to synchronize message transmission.

SUMMARY

In general overview, the methods and systems described herein provide stealth communications by minimizing or eliminating detectable artifacts in a signal. In particular, the methods and systems are used to provide a signal that appears as random noise. The methods and systems can be used to synchronize the signal (e.g., to synchronize a transmitter and a receiver) without introducing detectable artifacts.

In some embodiments, the methods and systems described herein include encoding a synchronization key in a synchronization signal and modulating the synchronization signal using Gaussian noise generated by a pseudo random number generator. The synchronization signal is used to synchronize a message signal (also modulated using Gaussian noise generated by a pseudo random number generator). More particularly, a transmitter transmits the synchronization signal and the message signal. A receiver receives the synchronization signal and the message signal and synchronizes the message signal based on receipt of the synchronization key. Advantageously, the synchronization signal and the message signal appear as random noise devoid of any detectible features or traces to evade detection during message synchronization and message communications.

In one aspect, a method of communicating includes generating a synchronization signal having encoded therein a synchronization key, modulating the synchronization signal using Gaussian noise generated by a pseudo-random number generator, modulating a message signal using Gaussian noise generated by the pseudo-random number generator, synchronizing the message signal including demodulating the synchronization signal based on the synchronization key such that the synchronization signal and the message signal appear as random noise.

In further embodiments, the method includes one or more of the following features: modulating the synchronization signal includes rectifying the Gaussian noise; modulating the synchronization signal includes encoding the synchronization signal using forward error correction demodulating the synchronization signal includes decoding the synchronization signal using forward error correction; demodulating the synchronization signal includes processing the synchronization signal using a pseudo-random number generator to generate Gaussian noise and rectifying the Gaussian noise; demodulating the synchronization signal includes demodulating at least one sample of the synchronization signal to generate the synchronization key; demodulating the synchronization signal includes segregating the synchronization signal into a plurality of sample sets, rendering a series of threshold values based on summing each sample set, and generating signal bits based on the series of threshold values, and; the threshold values include discrete values based on whether the sum of each sample set is greater than zero or less than zero.

In another aspect, a communications system includes a modulator having a first input to receive a synchronization key and to generate a synchronization signal having encoded therein the synchronization key to enable synchronization of a message signal, a second input to generate Gaussian noise generated by a pseudo-random number generator, and an output port to provide a modulated synchronization signal. The modulated synchronization signal and the message signal appear as random noise.

In a further embodiment, the communications system includes one or more of the following features: the first input receives the message signal, the output port provides a modulated message signal, and Gaussian noise is rectified in at least one of the synchronization signal or the message signal; the modulator encodes the synchronization signal using a forward error correction encoder; a demodulator having a first input to receive the synchronization signal, a second input to receive a comparison signal, and an output port to provide a synchronization output signal; the demodulator decodes the synchronization signal using a forward error correction decoder; the demodulator generates the comparison signal using a pseudo-random number generator to generate Gaussian noise and a rectifier to rectify the Gaussian noise; the demodulator generates the synchronization output signal based on the synchronization key encoded in the received synchronization signal; the demodulator segregates the synchronization signal into a plurality of sample sets, renders a series of threshold values by summing each sample set, and generates signal bits based on the series of threshold values, and; the demodulator renders the series of threshold values based on whether each sample set sums to a value that is greater than zero or less than zero.

In a further aspect, a computer-readable medium having encoded thereon software to synchronize a message signal includes instructions to enable generating a synchronization signal having encoded therein a synchronization key, modulating the synchronization signal using Gaussian noise generated by a pseudo-random number generator, modulating the message signal using Gaussian noise generated by the pseudo-random number generator, and synchronizing the message signal including demodulating the synchronization signal based on the synchronization key. The synchronization signal and the message signal appear as random noise.

In further embodiments, the computer-readable medium includes one or more of the following features: modulating the synchronization signal includes rectifying the Gaussian noise; modulating the synchronization signal includes encoding the synchronization signal using forward error correction and demodulating the synchronization signal includes decoding the synchronization signal using forward error correction; demodulating the synchronization signal includes processing the synchronization signal using a pseudo-random number generator to generate Gaussian noise and rectifying the Gaussian noise; demodulating the synchronization signal includes demodulating at least one sample of the synchronization signal to generate the synchronization key; demodulating the synchronization signal includes segregating the synchronization signal into a plurality of samples, rendering a series of threshold values based on summing each sample set, and generating signal bits based on the series of threshold values, and; the series of threshold values is based on whether each sample set sums to a value that is greater than zero or less than zero.

BRIEF DESCRIPTION OF THE DRAWINGS

The foregoing features of the systems and methods described herein may be more fully understood from the following description of the drawings in which.

DETAILED DESCRIPTION

Before embarking on a detailed description of the inventive concepts, techniques, and systems described herein, it may be useful to provide a general overview of noise modulation and encryption used in communications.

A sample communications message may be represented as data bits by the function b(k), where the variable k will always represent a non-negative integer. When extended to real values, the sample communications message may be represented by the formula b(t)=b(k), where the variable t will always represent a non-negative real number and where the variable k satisfies k≤t<k+1. Let the real-valued function n(t) represent so called "random noise" such that for all values of k the following is true:

$$\int_k^{k+1} n^2(t)dt \approx 1$$

Also, let the real-valued function N(t) represent "environmental noise."

Using these representative functions, a noise-modulated signal s(t) may be represented by the formula s(t)=b(t)n(t), and the received signal r(t) may be represented by the formula r(t)=b(t) n(t)+N(t). The received message bits represented by $\tilde{b}(k)$ may be obtained by demodulating the received signal r(t). The following equations may be used to demodulate the received signal r(t) by multiplying the received signal r(t) by random noise n(t) and integrating the result:

$$\tilde{b}(k) = \text{sgn} \int_k^{k+1} n(t)r(t)dt$$
$$= \text{sgn} \int_k^{k+1} n(t)(b(t)n(t) + N(t))dt$$
$$= \text{sgn} \int_k^{k+1} b(t)n^2(t) + b^2(t)n(t)N(t)dt$$
$$\approx b(k)\text{sgn}\left(1 + b(k) \int_k^{k+1} n(t)N(t)dt\right)$$

These equations are valid as long as the environmental noise N(t) is not too big (for example, as long as $$\left| \int_k^{k+1} n(t)N(t)dt \right| < 1;$$

or, more precisely, that $$-b(k) \int_k^{k+1} n(t)N(t)dt < 1 \right).$$

It should be noted that the sign of the received bit $\tilde{b}(k)$ will be the same as the sign of transmitted bit b(k).

Figure 1:
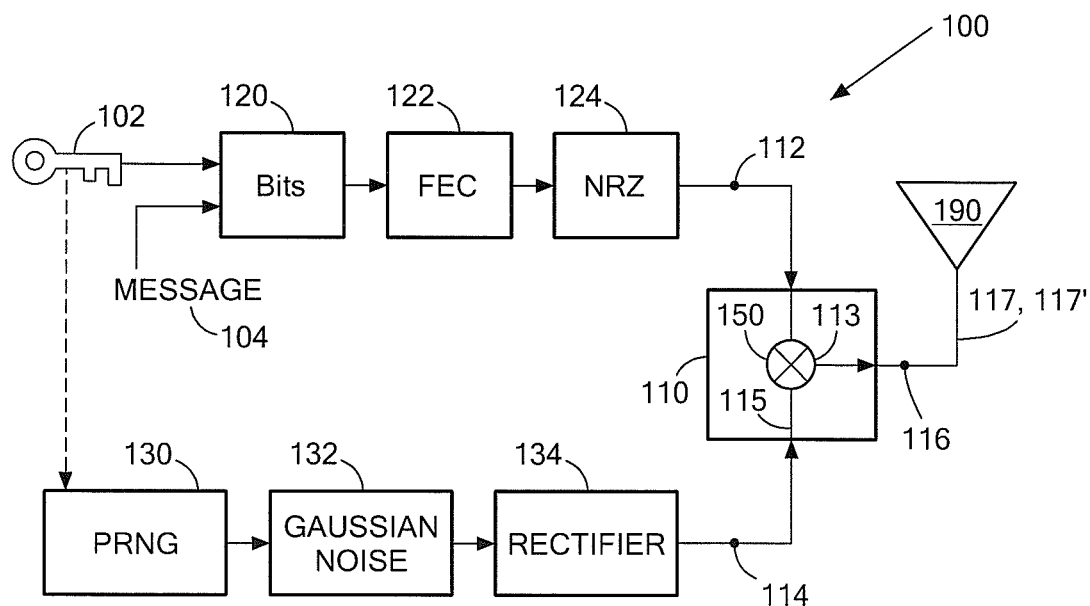
FIG. 1 is a block diagram showing an embodiment of a communications system for stealth modulation, including a modulator.

Referring now to FIG. 1, in one embodiment, communications system 100 includes modulator 110 having first input 112 to receive synchronization key 102 and to generate synchronization signal 113 having encoded therein synchronization key 102 to enable synchronization of a message signal, second input 114 to generate a modulation signal 115 including Gaussian noise generated by a pseudo-random number generator (PRNG) 130, and an output port 116 to provide modulated synchronization signal 117 which appears as random noise at transmitter 190.

In a further embodiment, first input 112 of modulator 110 is coupled to receive synchronization key bits (generally designated by reference numeral 120) encoded by forward error correction encoder 122. Optionally, non-return-to-zero (NRZ) encoder 124 encodes synchronization key bits 120 into a series of discrete values (e.g., a series of positive and negative values) for transmission.

In the same or different embodiment, second input 114 of modulator 110 is coupled to receive Gaussian noise 132 generated by PRNG 130 provided with synchronization key 102. In a further embodiment, rectifier 134 modifies the Gaussian noise to render a carrier waveform. In particular, rectifier 134 segregates Gaussian noise into one or more bit periods which are either greater than or less than 0. If the bit period is less than zero, the rectifier negates the bit period.

Combiner 150 processes synchronization signal 113 and modulation signal 115 to generate modulated synchronization signal 117 at output port 116 for transmission at transmitter 190.

In another embodiment, first input 112 of modulator 110 is further coupled to receive a message 104 including message bits (generally designated by reference numeral 120) encoded by forward error correction encoder 122 and converted into a series of discrete values by non-return-to-zero (NRZ)

encoder 124. The processed message bits are combined with a carrier waveform including Gaussian noise 132 generated by PRNG 130 and rectified by rectifier 134 to generate a modulated message signal 117' at output port 116 for transmission at transmitter 190.

In a further embodiment, the pseudo-random number generator includes a cryptographically secure pseudo-random number generator. In still further embodiments, the cryptographically secure pseudo-random number generator includes a Yarrow generator, a Fortuna generator, or an Indirection, Shift, Accumulate, Add, and Count (ISAAC) generator.

Figure 1A:
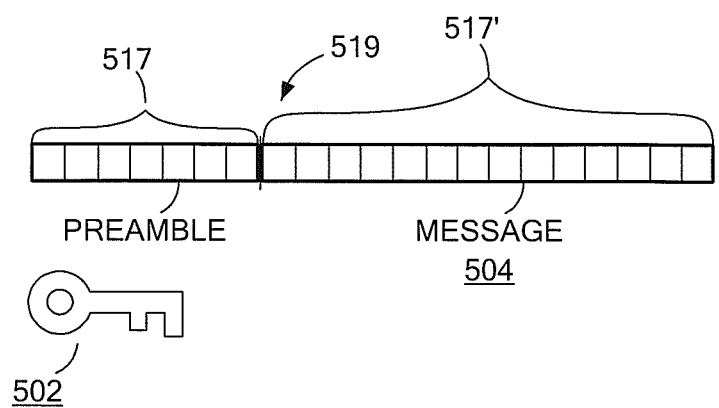
FIG. 1A is a pictorial representation of an embodiment of a stealth communications signal including a synchronization component and a message component.

Referring now to FIG. 1A and again to FIG. 1, modulator 110 can be said to generate a stealth modulation signal 519 including stealth modulation synchronization signal 517 (which may be referred to as a preamble to a message) and stealth modulation message signal 517'. The stealth modulation signal 519, therefore, includes synchronization key 502 and message 504. Advantageously, synchronization and message components of stealth modulation signal 519 appear as random noise without detectible artifacts to evade unauthorized attempts to detect the signal 519 and obtain the message 504.

Referring now to FIG. 2 and again to FIG. 1, in another embodiment communications system 200 further includes demodulator 210 having first input 212 to receive synchronization signal 213, second input 252 to receive comparison signal 215, and output port 216 to provide synchronization output signal 217 based on receipt of synchronization key 102 (encoded in synchronization signal 213) at receiver 290.

In further embodiment, receiver 290 receives signal 293 which is buffered in buffer 260. Buffer 260 provides signal samples to thresholder 262, e.g. in a first-in first out (FIFO) fashion.

Thresholder 262 processes signal samples to generate threshold values to generate signal bits 220. More particularly, thresholder 262 sums signal samples to generate values which may be greater than zero or less than zero. Thresholder 262 generates signal bits 220 by converting the summed samples into discrete values (e.g., positive and negative values) based on whether summed samples are greater than zero or less than zero.

FEC decoder 222 decodes the bits 220 which are input into PRNG 230 and used to generated Gaussian noise 232. Rectifier 234 rectifies the Gaussian noise 234 (in the same or similar way as rectifier 134 described in conjunction with FIG. 1). Second input 252 is coupled to rectifier 234 to receive comparison signal 215.

In the same or different embodiment, first input 212 is coupled to buffer 260 to receive synchronization signal 213 and more particularly, a sample of received signal 293 which may include at least at portion of encoded synchronization key 102 included in transmitted synchronization signal 117. Comparator 250 processes synchronization signal 213 and comparison signal 215 to output synchronization output signal 217 at output port 216.

Demodulator 210 generates synchronization output signal 217 based on whether or not receiver 290 has received synchronization key 102. In some embodiments, at 295, if receiver 290 has received synchronization key (a predetermined condition designated by reference numeral 295A), then synchronization of transmitter 190 and receiver 290 has occurred and receiver 290 can begin to receive message signal 117'. If, at 295, receiver 290 has not received synchronization key 102 (a predetermined condition designated by reference number 295B), then further samples 262 buffered at buffer 260 are processed to reattempt to synchronize transmitter 190 and receiver 290.

Demodulation and synchronization of the received signal 293 will now be described in more detail. Suppose that the average random noise is represented by the following formula:

$$\int_{k}^{k+1} n(t)dt$$

In most instances, the average random noise is close to zero (i.e., slightly greater than or slightly less than zero), but not equal to zero. Let $n_+(t)$ be equal to $n(t)$ in the intervals $k \leq t < k+1$ where the average $$\int_{k}^{k+1} n(t)dt$$

is positive, and let $n_+(t)$ be equal to $-n(t)$ in the intervals $k \leq t < k+1$ where the average $$\int_{k}^{k+1} n(t)dt$$

is negative.

As described above, modulator 110 encodes the synchronization key 102 in synchronization signal 117. Demodulator 210 receives synchronization signal 117 and synchronizes the transmission. More particularly, the demodulator 210 receives encoded synchronization key 102 and decodes it to properly synchronize the transmission.

In a particular operation of communications system 200, suppose signal 117 (represented by $b(k)$) encodes the synchronization key 102. Signal 117 may be represented by the following equation:

$$s(t)=b(t)n_+(t)$$

Here, $s(t)$ can be demodulated without knowledge of $n_+(t)$ because the sign of $b(t)$ is the same as the sign of $$\int_{k}^{k+1} s(t)dt = \int_{k}^{k+1} b(t)n_+(t)dt$$
$$= b(k)\int_{k}^{k+1} n_+(t)dt$$

since $$\int_{k}^{k+1} n_+(t)dt > 0.$$

It should be noted that the environmental noise $N(t)$ in the received signal $r(t)=s(t)+N(t)$ may alter (and hinder) demodulation of the received signal $r(t)$ in the following way:

$$\tilde{b}(k) = \text{sgn}\int_{k}^{k+1} r(t)dt$$
$$= \text{sgn}\int_{k}^{k+1} s(t) + N(t)dt$$

$$= \operatorname{sgn} \int_k^{k+1} b(t)n_+(t) + N(t)dt$$

$$= b(k)\operatorname{sgn}\left(\int_k^{k+1} n_+(t) + b(t)N(t)dt\right)$$

However, $\tilde{b}(k)$ is valid only if $$\left|\int_k^{k+1} N(t)dt\right| < \int_k^{k+1} n_+(t)dt,$$

or, more precisely, $$b(k)\int_k^{k+1} N(t)dt < \int_k^{k+1} n_+(t)dt.$$

Figure 3:
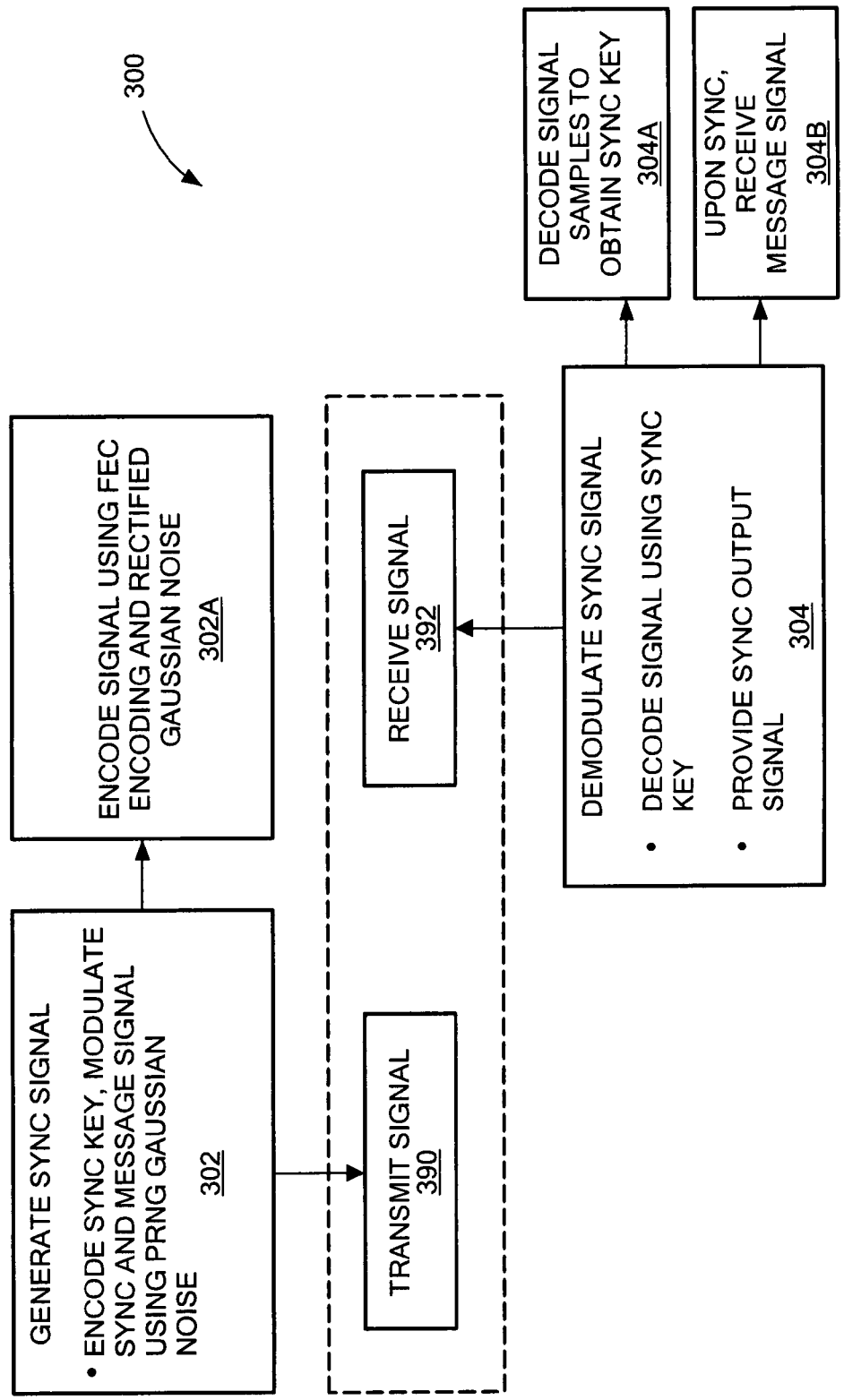
FIG. 3 is a flow diagram of an embodiment of a method of communicating using stealth modulation.

Referring now to FIG. 3, in one aspect, a method 300 of communication using stealth modulation includes, at 302, generating a synchronization signal including encoding a synchronization key into the synchronization signal and modulating the synchronization signal using PRNG generated Gaussian noise seeded with the synchronization key. In further embodiments, the method 300 includes, at 302A, FEC encoding the synchronization signal and/or rectifying the Gaussian noise. In the same or different embodiment, a message signal is modulated using PRNG generated Gaussian noise.

Figure 2:
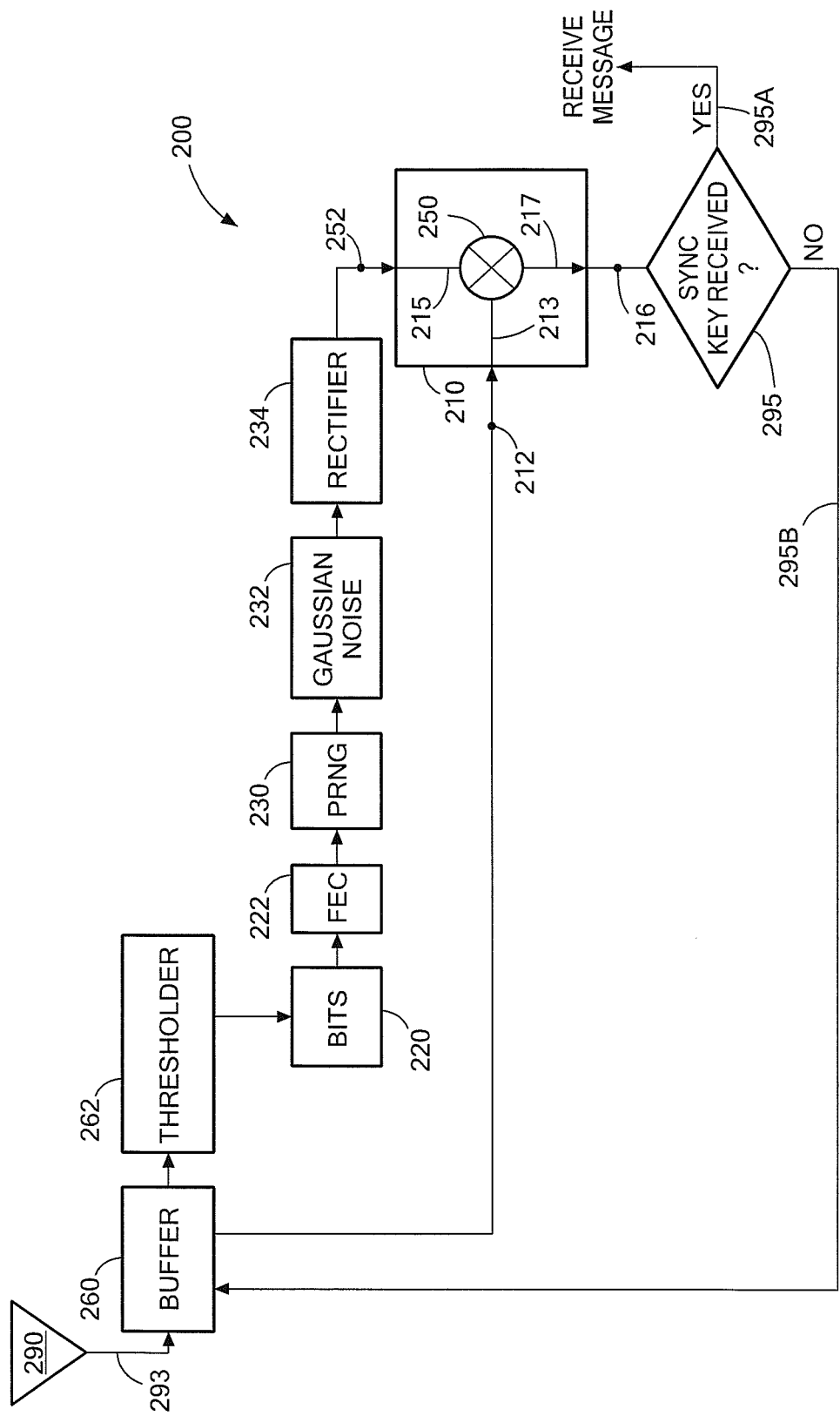
FIG. 2 is a block diagram showing another embodiment of the communications system of FIG. 1, further including a demodulator.

As be seen in FIG. 3, at 390, the signal may be transmitted (e.g., using a transmitter as may be similar to transmitter 190 described in conjunction with FIG. 1) and, at 392, the signal may be received using a receiver (e.g., using a receiver as may be similar to receiver 290 described in conjunction with FIG. 2). Advantageously, the method 300 provides a modulated signal that appears as random noise and minimizes detectability during transmission. Furthermore, the method 300 enables synchronization between a transmitter and a receiver without introducing any detectable artifacts.

In a further embodiment, the method 300 includes, at 304, demodulating the synchronization signal including decoding the synchronization signal to obtain the synchronization key and providing a synchronization output signal indicative of whether or not a transmitter and a receiver have been synchronized. In further embodiments, the method 300 includes, at 304A, decoding signal samples to attempt to obtain the synchronization key and, at 304B, upon synchronization, receiving a message signal.

It should be further noted that portions of the above-described inventive systems and techniques may be implemented in hardware, software, or combinations thereof. For example, at least a portion of a communications system (as may be similar to communications system 100 and 200 described above in conjunction with FIGS. 1 and 2) may be implemented in hardware (including, but not limited to, signal processing hardware and related components) and at least another portion of the communications system may be implemented using instructions stored in a computer-readable medium (including, but not limited to, a memory or storage device). The instructions are loaded on a processor to be executed. For example, the above-described modulator 110 and/or demodulator 210 may be implemented in hardware as a set of electronic components, in software as a set of programming instructions loaded from a memory or a storage device and executed in a processor, or in a combination of hardware and software. Furthermore, some, none, or all of the above-described features (i.e., the PRNG, forward error correction encoder/decoder, combiner, comparator, etc.) may be implemented in hardware, software, or combinations thereof.

Figure 4:
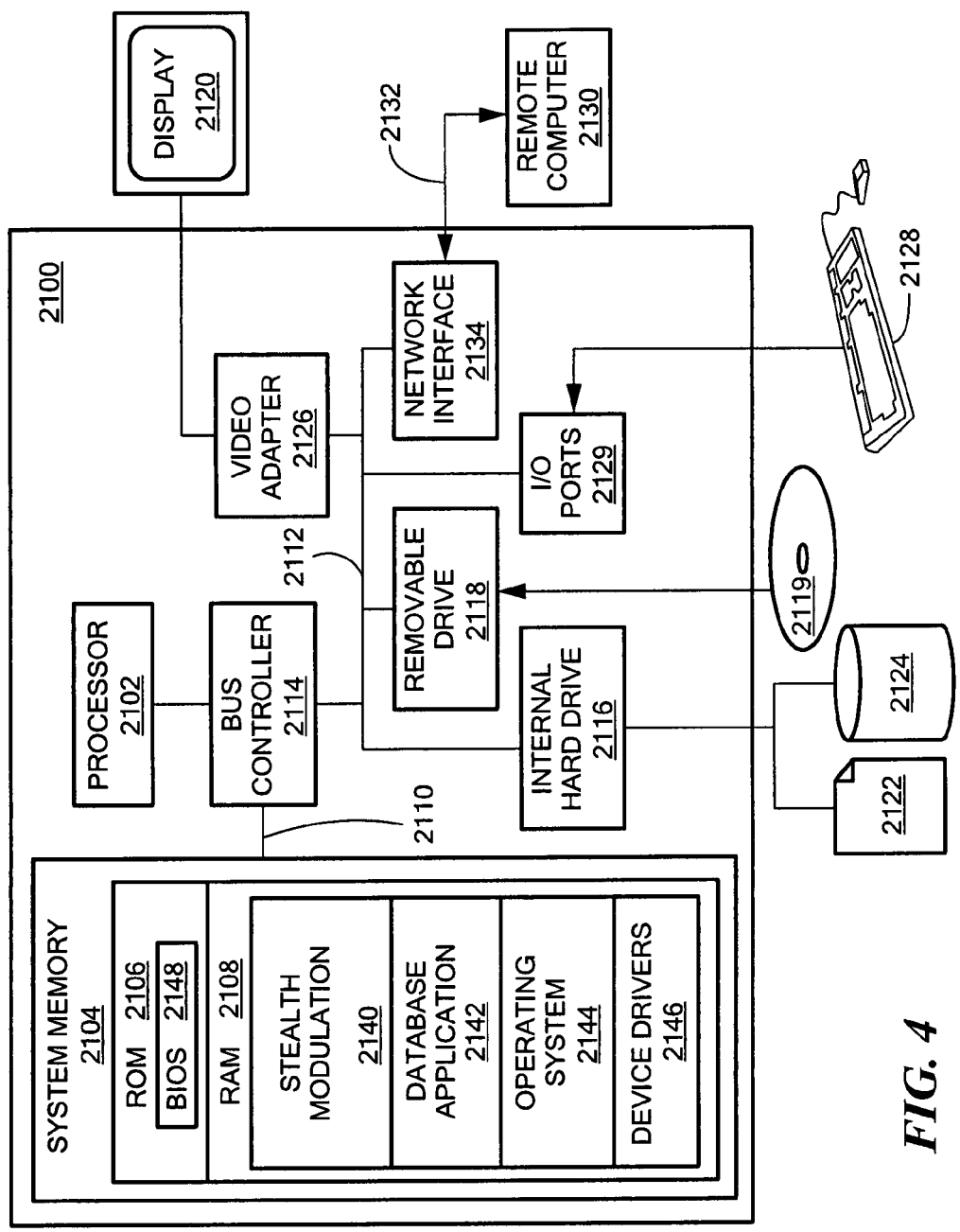
FIG. 4 is a diagram showing an exemplary hardware and operating environment of a suitable computer for use with embodiments of the inventive systems and techniques described herein.

FIG. 4 illustrates a computer 2100 suitable for supporting the operation of an embodiment of the inventive systems and techniques described herein. The computer 2100 includes a processor 2102, for example, a desktop processor, laptop processor, server and workstation processor, and/or embedded and communications processor. As by way of a non-limiting example, processor 2102 may include an Intel® Core™ i7, i5, or i3 processor manufactured by the Intel Corporation of Santa Clara, Calif. However, it should be noted that the computer 2100 may use other microprocessors. Computer 2100 can represent any server, personal computer, laptop, or a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing a modulator (e.g., a modulator of the type described in conjunction with FIG. 1) and/or a demodulator (e.g., a demodulator of the type described in conjunction with FIG. 2). The modulator may receive a message and/or other types of information from an external system. The message and/or information may be outputted to enable a user to view or listen to the message. For example, a message may be outputted to display 2120 or to an audio device to enable a user to view or listen to the message.

In a further embodiment, the computer 2100 may execute a modulator on a first processor and other features on a second processor (e.g., a pseudo-random number generator of the type described in conjunction with FIG. 1 may execute on the second processor). Furthermore, the first and second processors may be respective processors of a dual-core processor. Alternatively, the first and second processors may respective first and second computing devices which communicate over a network.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Certain terms are used throughout the description and claims to refer to system components. However, it will be readily appreciated that organizations may refer to a component by different names. This document does not intend to distinguish between components that differ in name but not function. In the discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

What is claimed is:

1. A method of communicating, comprising:
    generating a synchronization signal having encoded therein a synchronization key;
    modulating the synchronization signal using Gaussian noise generated by a pseudo-random number generator;
    modulating a message signal using Gaussian noise generated by the pseudo-random number generator; and
    synchronizing the message signal including demodulating the synchronization signal based on the synchronization key,
    wherein the demodulating comprises receiving the synchronization signal at a first input, receiving a comparator signal at a second input and providing at an output port a synchronization output signal based on the synchronization key encoded in the received synchronization signal,
    wherein the synchronization signal and the message signal appear as random noise.

2. The method of claim 1, wherein modulating the synchronization signal includes rectifying the Gaussian noise.

3. The method of claim 1, wherein modulating the synchronization signal comprises encoding the synchronization signal using forward error correction; and
    wherein demodulating the synchronization signal further comprises decoding the synchronization signal using forward error correction.

4. The method of claim 1, wherein demodulating the synchronization signal comprises:
    segregating the synchronization signal into a plurality of sample sets;
    rendering a series of threshold values based on summing each sample set; and
    generating signal bits based on the series of threshold values.

5. The method of claim 4, wherein the threshold values include discrete values based on whether the sum of each sample set is greater than zero or less than zero.

6. The method of claim 1, wherein demodulating the synchronization signal comprises:
    generating Gaussian noise and rectifying the Gaussian noise.

7. A communications system, comprising:
    a modulator having a first input to receive a synchronization key and to generate a synchronization signal having encoded therein the synchronization key to enable synchronization of a message signal, a second input to generate Gaussian noise generated by a pseudo-random number generator, and an output port to provide a modulated synchronization signal; and
    a demodulator having a first input to receive the synchronization signal, a second input to receive a comparison signal, and an output port to provide a synchronization output signal based on the synchronization key encoded in the received synchronization signal,
    wherein the modulated synchronization signal and the message signal appear as random noise.

8. The communications system of claim 7, wherein the first input receives the message signal, the output port provides a modulated message signal, and Gaussian noise is rectified in at least one of the synchronization signal or the message signal.

9. The communications system of claim 8, wherein the modulator encodes the synchronization signal using a forward error correction encoder.

10. The communications system of claim 7, wherein the demodulator decodes the synchronization signal using a forward error correction decoder.

11. The communications system of claim 7, wherein the demodulator generates the comparison signal by generating Gaussian noise and using a rectifier to rectify the Gaussian noise.

12. The communications system of claim 7, wherein the demodulator segregates the synchronization signal into a plurality of sample sets, renders a series of threshold values by summing each sample set, and generates signal bits based on the series of threshold values.

13. The communications system of claim 12, wherein the demodulator renders the series of threshold values based on whether each sample set sums to a value that is greater than zero or less than zero.

14. An article comprising:
a non-transitory computer-readable medium storing executable instructions that cause a machine to synchronize a message signal, the instructions causing a machine to:
generate a synchronization signal having encoded therein a synchronization key;
modulate the synchronization signal using Gaussian noise generated by a pseudo-random number generator;
modulate the message signal using Gaussian noise generated by the pseudo-random number generator; and
synchronize the message signal comprising instructions causing the machine to demodulate the synchronization signal based on the synchronization key,
wherein the instructions causing the machine to demodulate comprises instructions causing the machine to receive the synchronization signal at a first input, to receive a comparator signal at a second input and to provide at an output port a synchronization output signal based on the synchronization key encoded in the received synchronization signal,
wherein the synchronization signal and the message signal appear as random noise.

15. The article of claim 14, wherein the instructions causing the machine to modulate the synchronization signal comprises instructions causing the machine to rectify the Gaussian noise.

16. The article of claim 14, wherein the instructions causing the machine to modulate the synchronization signal comprises instructions causing the machine to encode the synchronization signal using forward error correction; and
wherein the instructions causing the machine to demodulate the synchronization signal comprises instructions causing the machine to decode the synchronization signal using forward error correction.

17. The article of claim 14, wherein the instructions causing the machine to demodulate the synchronization signal comprises further comprises instructions causing the machine to:
process the synchronization signal by generating Gaussian noise; and
rectify the Gaussian noise.

18. The article of claim 14, wherein the instructions causing the machine to demodulate the synchronization signal further comprises instructions causing the machine to:
segregate the synchronization signal into a plurality of sample sets;
render a series of threshold values based on summing each sample set; and
generate signal bits based on the series of threshold values.

19. The article of claim 18, wherein the series of threshold values is based on whether each sample set sums to a value that is greater than zero or less than zero.

20. The article of claim 14, wherein the instructions causing the machine to demodulate the synchronization signal further comprises instructions causing the machine to demodulate at least one sample of the synchronization signal to generate the synchronization key.

* * * * *